US011999186B2

(12) United States Patent
Kalen

(10) Patent No.: US 11,999,186 B2
(45) Date of Patent: Jun. 4, 2024

(54) CENTERLESS DRAFTING TOOL

(71) Applicant: Glen Kalen, Jamestown, CO (US)

(72) Inventor: Glen Kalen, Jamestown, CO (US)

( * ) Notice: Subject to any disclaimer, the term of this patent is extended or adjusted under 35 U.S.C. 154(b) by 308 days.

(21) Appl. No.: 17/669,854

(22) Filed: Feb. 11, 2022

(65) Prior Publication Data

US 2023/0256770 A1 Aug. 17, 2023

(51) Int. Cl.
*B43L 9/00* (2006.01)
*B43L 9/02* (2006.01)

(52) U.S. Cl.
CPC ................. *B43L 9/005* (2013.01); *B43L 9/02* (2013.01)

(58) Field of Classification Search
CPC .................................. B43L 9/005; B43L 9/02
See application file for complete search history.

(56) References Cited

U.S. PATENT DOCUMENTS 390,360 A * 10/1888 Gieseler .................... B43L 9/04 33/27.05
724,687 A * 4/1903 Floren ..................... A47L 13/30 401/256
1,201,209 A * 10/1916 McMurray ................ B43L 9/04 33/27.03
1,629,143 A * 5/1927 Bungart .................... B43L 9/04 33/27.03
1,980,884 A * 11/1934 Sidney ...................... B43L 7/10 33/450
2,017,430 A * 10/1935 Anderson .............. B23K 7/105 266/70
2,523,237 A * 9/1950 Richardson ............ B23K 7/105 266/70
2,751,273 A * 6/1956 Rankin .................. G06G 7/485 33/18.1
3,002,280 A * 10/1961 Bennett, Jr. ............... B43L 9/04 33/27.03
3,174,736 A * 3/1965 Cameron ............... B23K 7/107 266/66
3,430,347 A * 3/1969 Minniear .................. B43L 9/04 33/27.03
3,638,319 A * 2/1972 Barlow .................. A63H 11/00 401/48
3,648,373 A * 3/1972 Morrison ................. B43K 8/00 33/18.1
4,053,987 A * 10/1977 Ram ....................... B43L 13/00 33/450
4,449,301 A * 5/1984 Backman ............. B43L 13/022 33/32.6
4,621,429 A * 11/1986 Alm ........................ B43L 13/00 33/18.1

(Continued)

FOREIGN PATENT DOCUMENTS

FR 2575420 A1 * 7/1986

*Primary Examiner* — John Fitzgerald
*Assistant Examiner* — Tania Courson
(74) *Attorney, Agent, or Firm* — Andrew Morabito

(57) ABSTRACT

A compass, comprising: a housing; a control dial; a drive gear, wherein the drive gear is attached to the control dial; an adjustment gear, wherein the adjustment gear is in in communication with the driver gear; a first gear portion in communication with the driver gear; a second gear portion in communication with the adjustment gear; and a plurality of wheels, wherein the wheels are secured to the first and second gear portions.

10 Claims, 3 Drawing Sheets

(56) References Cited

U.S. PATENT DOCUMENTS

| | | | | | |
|---|---|---|---|---|---|
| 4,680,864 | A * | 7/1987 | Heagerty | B43L 9/00 | D19/135 |
| 5,752,870 | A * | 5/1998 | Karasawa | B43L 11/05 | 33/18.1 |
| 6,223,443 | B1 * | 5/2001 | Jacobs | B43L 9/04 | 33/760 |
| 7,461,459 | B2 * | 12/2008 | Lin | B43L 9/04 | 33/30.6 |
| 8,806,766 | B1 * | 8/2014 | Lee | B43L 9/002 | 33/27.04 |
| 9,073,381 | B1 * | 7/2015 | Elmassry | B43L 9/045 | |
| 9,308,771 | B2 * | 4/2016 | Ghorbanloo | B43L 9/005 | |
| 9,457,612 | B2 * | 10/2016 | Ghorbanloo | B43L 9/005 | |
| 11,298,969 | B1 * | 4/2022 | Frederick, III | B43L 13/004 | |
| 2008/0168668 | A1 * | 7/2008 | Lin | B43L 9/04 | 33/30.6 |
| 2010/0000102 | A1 * | 1/2010 | Contreras | B43L 9/24 | 33/27.03 |
| 2016/0023502 | A1 * | 1/2016 | Ghorbanloo | B43L 9/04 | 33/27.03 |
| 2016/0185153 | A1 * | 6/2016 | Ghorbanloo | B43L 9/005 | 33/27.03 |

* cited by examiner

CENTERLESS DRAFTING TOOL

BACKGROUND OF THE INVENTION

The present invention relates to drafting equipment, and more particularly to a drafting compass capable of creating a wide variety of radii.

Drawing and measuring instruments are invented for measuring physical quantities and comparing physical quantities of the real-world objects and events. A compass is an essential drawing instrument that is used for inscribing circles, and arcs.

Today compasses are used in almost all industries. However, the conventional compasses are not usable when the radius is very large, or the center is not accessible. Further, the conventional compasses are not feasible to use when there is a barrier between the center and the arc. In some instances, the shop or workspace is too small to give adequate room to draw the arc or circle. The use of the conventional compasses in the above-mentioned circumstances are complex, time-consuming and inefficient.

Hence, there is a need for a drawing tool that is capable of drawing arcs and circles without the need for accessing the center. Further, there is a need for a drawing tool that is capable of drawing arcs and circles for large radius. Still further, there is a need for a drawing tool that is capable of drawing arcs and when there is a barrier between the center.

The above-mentioned shortcomings, disadvantages and problems are addressed herein, and which will be understood by reading and studying the following specification.

SUMMARY

Figure 1:
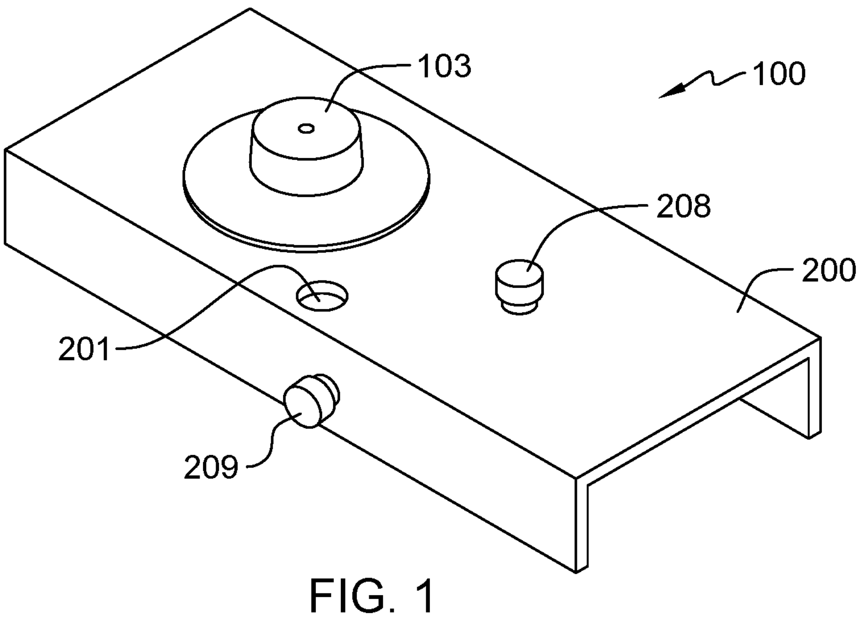
FIG. 1 depicts an isometric view of a compass, in accordance with one embodiment of the present invention.
Figure 2:
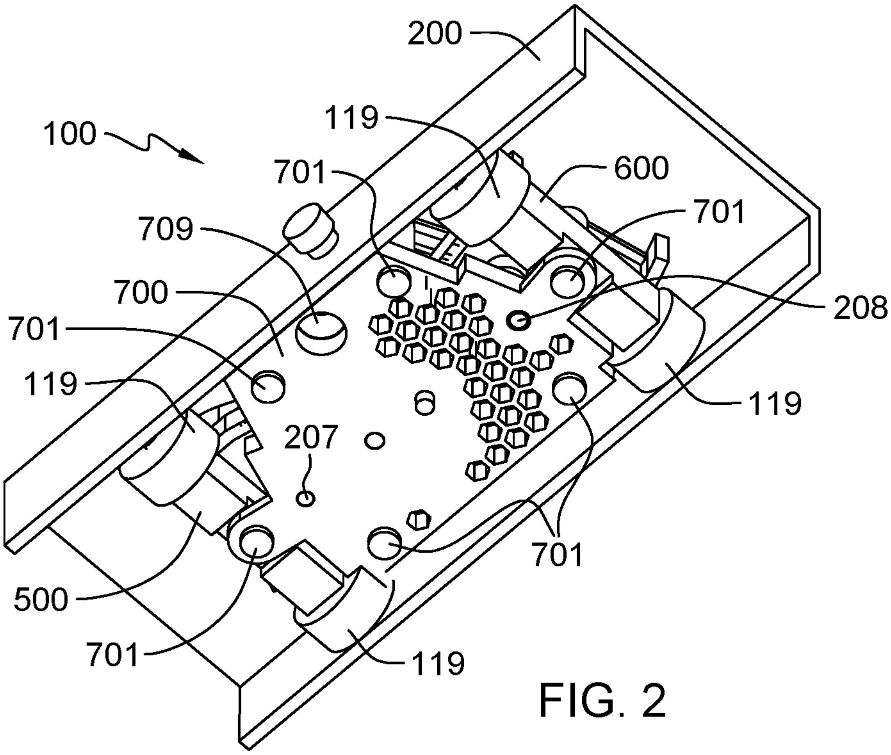
FIG. 2 depicts an isometric view of a compass, in accordance with one embodiment of the present invention.

Accordingly, in a first embodiment, the present invention is a compass, comprising: a housing; a control dial; a drive gear, wherein the drive gear is attached to the control dial; an adjustment gear, wherein the adjustment gear is in in communication with the driver gear; a first gear portion in communication with the driver gear; a second gear portion in communication with the adjustment gear; and a plurality of wheels, wherein the wheels are secured to the first and second gear portions.

DETAILED DESCRIPTION OF THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The present invention is a device that allows for drawing arcs and circles of varying sizes with ease, and with minimal tools. The present device (also referred to as a compass) is able to draw a wide variety of arcs and/or circles through the simple rotation of a dial which adjusts the positioning of at least one roller so that when the compass is rolled, it imitates the radius of the arc or circle. The compass provides an advantage over previously designed compasses, in that it is able to quickly and easily adjust from one radius length to the next with minimal moving and/or adjusting. The present invention provides a simple dial which is rotated to a set position based on the desired radius length of the operator.

The various components of the compass 100 may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like.

FIGS. 1-4 depicts various views of the compass 100, in accordance with one embodiment of the present invention. The compass has a housing 200 which encapsulates the internal components, gears, and wheels 119 of the compass 100. The housing 200 may have open ends as shown in the figures or may have encapsulated ends to secure the internal components inside and allow for access to the interior compartment. The end caps 102, in some embodiments, are removable. In some embodiments, the end caps 102 and the housing 200 are a single unitary element. The housing has an opening 201 that is sized for a pen or pencil can pass through the housing 200. Dial 103 is used to adjust the positioning of the wheels to adjust the arch or radius which can be drawn by the compass. It has a shaft 207 which extends through to the internal components and passes through opening 206 of the housing. In some embodiments the housing 200 and the dial 103 may have markers to show different radii or arch lengths for the user to select.

In the depicted embodiment, the housing 200 has an open bottom. In some embodiments, the bottom side of the housing 200 has openings for wheels 119 to extend through. These openings would be sized to allow for the maximum rotation and repositioning of the wheels 119 so as to allow the positioning of the dial 103 to be permissible without excess space in the openings. Pin 209 is used to secure the pencil or writing utensil in place once inserted through opening 201. Pin 208 is used to secure the internal components in place through opening 210 and allow for remove of the internal components by the removal of the pin 208.

Figure 4:
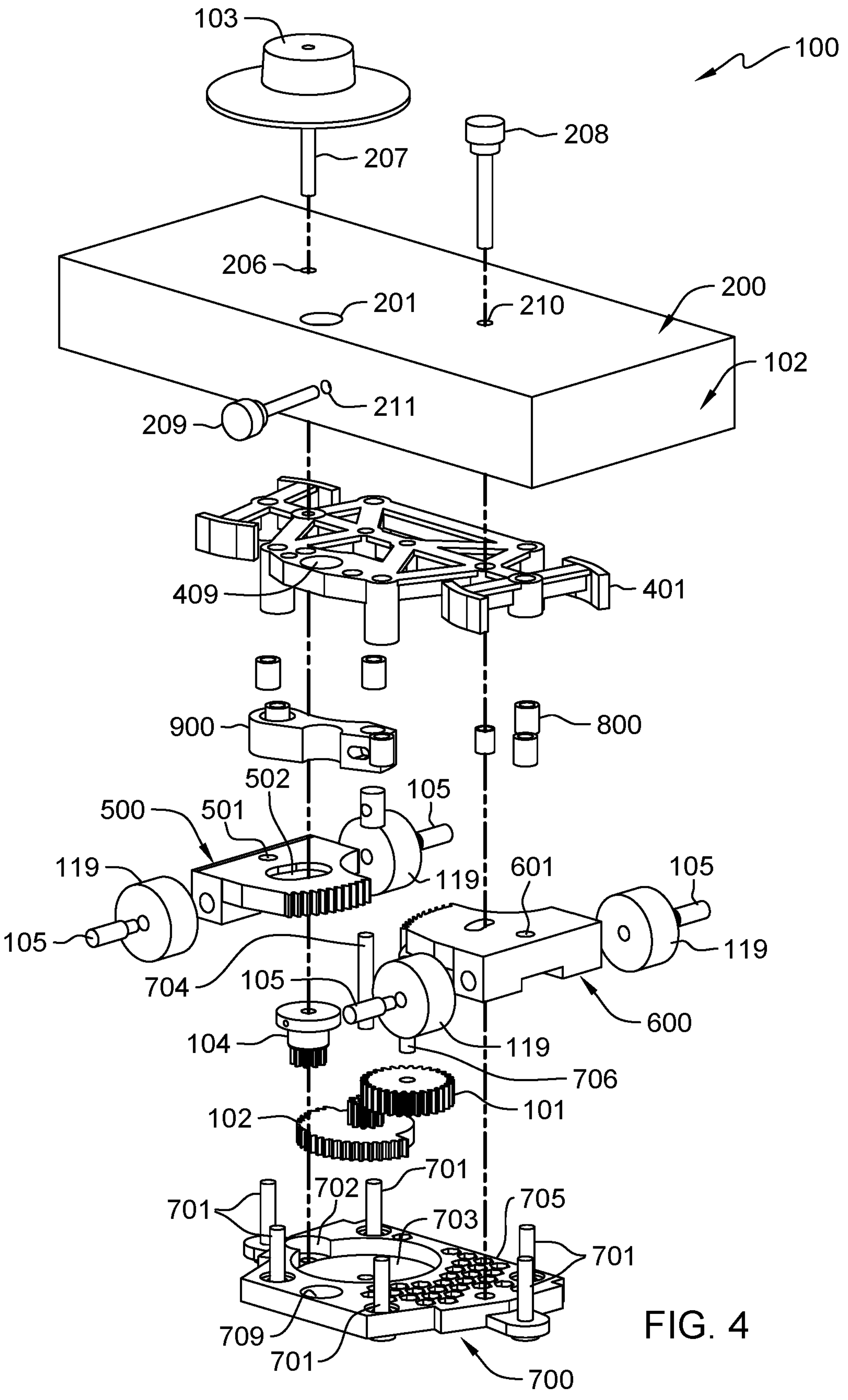
FIG. 4 depicts an exploded view of the compass, in accordance with one embodiment of the present invention.

FIG. 4 depicts and exploded view of compass 100, in accordance with one embodiment of the present invention. An upper frame member 400 and a lower frame member 700 are designed to provide the structure for the gears and internal members to be positioned and secured in place within the housing 200, while permitting the internal components to move freely. The upper frame member 400 has a predetermined design to provide adequate structural rigidity and also use minimal material and machining. The depicted embodiment of the upper frame member 400 is just one design of the upper frame member which can be used. The lower frame member 700 has a predetermined design to provide adequate structural rigidity and also use minimal material and machining. The depicted embodiment of the lower frame member 700 is just one design of the upper frame member which can be used.

Extensions 701 from the lower frame member 700 extend upwards. Extensions 701 align with openings in the upper frame member 400 to secure the two frame members in place. The upper frame member 400 has body which is sized and shaped to fit within the housing 200 and have a series of openings to allow the passage of the pins 207, 208, and 209 and rods to secure the upper and lower frame members 400 and 700 together as well as secure the adjustment members 500 and 600, the gears, and the wheels in place. The upper frame member 400 has opening 409 to allow the passage of the pencil through the upper frame member 400, openings 409 is aligned with openings 709 of the lower frame member 700. Member 500 has opening 501 which is sized to receive extension 701 and member 600 has an opening 601 which is sized to receive extension 703. This secures members 500 and 600 in place while allowing them to freely rotate. Inserts 800 are secured within the openings of upper frame member 400. Inserts 800 are threaded so that the corresponding extension 701 can be secured within the insert 800. The extensions 701 are threaded to mate with the inserts 800. This assists in forming the internal assembly of the compass.

Arm 900 is integrated into the compass and connected to pin 209 to secure the writing utensil in place. As the pin 209 is rotated, the arm 900 moves tightening around the writing utensil. Arm 900 has an opening which is fitted about the upper frame member 400 to be able to rotate about the upper frame member 400.

Lower frame member 700 has body 705 which is sized and shaped to fit within the housing and have a series of openings to allow the passage of the pins and rods to secure the upper and lower frame members together as well as secure the adjustment members 500 and 600 in place. The body 705 is of a predetermined thickness and shape. In the depicted embodiment, the body 705 has a series of cutouts to reduce weight and material costs. The body 705 has recessed areas 702 and 703 to accommodate gears 104 and 102 respectively.

Figure 3:
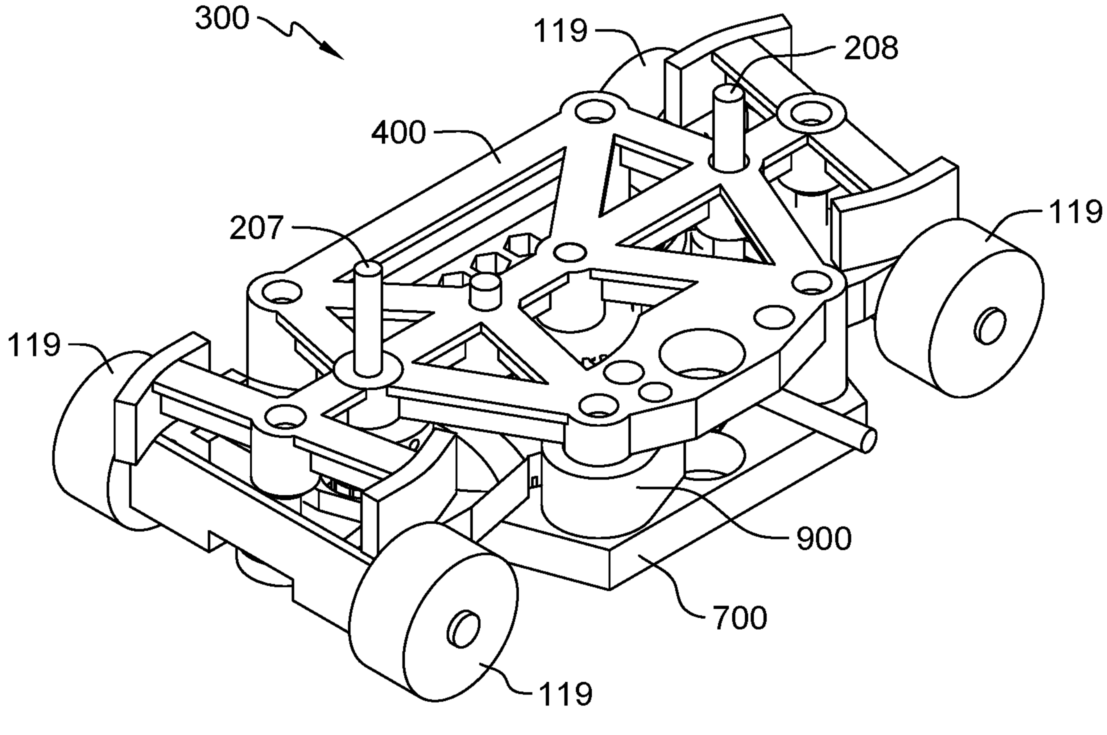
FIG. 3 depicts an assembly view of the compass, in accordance with one embodiment of the present invention.

As shown in FIG. 3, the compass assembly 300 is shown with the case 200 removed. The upper and lower frame members 400 and 700 are designed so that they will not interfere with the positioning of the wheels 119 at the most extreme angle.

Members 500 and 600 are connect to wheels 119 and interface with the gears so that when the dial 103 is rotated, the adjustment members 500 and 600 are repositioned to create the intended arch or curvature and the wheels will be positioned to allow the compass to follow that arch path. The members 500 and 600 are secured in place by pins 701 to allow for rotation of the members 500 and 600 about the pin. Wheels 119 are secured by shafts 105 which are secured to the members 500 and 600. In the depicted embodiment the shafts 105 are inserted into openings in the members 500 and 600, but other securing means may be implemented. Member 500 has openings 501 to allow the passage of pin 701 and is sized and shaped to allow the rotation of the member 500. Opening 502 allows for the passage of pin 207 of the dial to pass through and secure with gear 104. One end of the member 500 has a curved design and the curved design has teeth which mate with the upper portion of gear 102. Gear 102 has an upper portion and a lower portion. The upper portion mates with member 500 and the lower portion mates with gear 104.

Member 600 has openings 601 to allow the passage of pin 701 and is sized and shaped to allow the rotation of the adjustment member 600. Member 600 has an end which is curved and has teeth, these teeth are sized and designed to mate with gear 101. Pin 706 is inserted through gear 101 and is used to secure the gear in place relative to the upper frame member 400 and the lower frame member 700.

The members 500 and 600 have a curved end with teeth and are designed to interact with the gears. Member 500 interfaces with gear 102 and member 600 interfaces with gear 101. The gears 101, 102, and 104 are of predetermined diameters and with predetermined teeth, pitch, and the like so that the gears are able to interface with one another and are also at the predetermined gearing ratio. Pin 704 is inserted through gear 102 and is used to secure the gear in place relative to the upper frame member 400 and the lower frame member 700.

In the depicted embodiment, the gearing ratio between the upper portion of gear 102 and gear 101 is 4:1. The adjustment members 500 and 600 have a gearing ratio of 1:1. In additional embodiment, various ratios between the gears may be used dependent upon the radii which the compass is able to achieve. The compass is able to achieve a multitude of different achievable radii curvatures. In various embodiments, the gears are replaceable to allow for different gearing ratios. The gears and adjustment members all have a predetermined number of teeth based on the ratios and the physical size of the component; however, all of the gears and gear portions have teeth which are able to interface with the gears or gear portions in which they are in mechanical communication with.

The dial 103 is connected to the pin 207 which is secured to gear 104 to allow for the compass to adjust the arch length which are able to be achieved by the compass. Gear 104 interfaces with the lower portion of gear 102, as gear 104 is rotated (by the dial 103) the upper and lower portions of gear 102 rotate simultaneously and in unison, the upper portion of gear 102 interfaces with the teeth of member 500, and gear 101, and gear 101 interfaces with member 600. As the dial is rotated all these components rotate and reposition the wheels so that when the compass is rolled it follows a predetermined arch length. Gears 104 and the lower portion of gear 102 are housed within the recessed areas 702 and 703 of the lower frame 700.

A plurality of numbers are printed (or etched) onto the surface of the housing 100 to provide reference points for various radius lengths that are predetermined. In additional embodiments various other radius lengths may be printed on the housing 100 depending on the intended use of the compass 100 and the design of the internal mechanics. An opening 201 is present on the housing to receive a pen or pencil, so that the arch can be drawn on the surface. In some embodiments, a set screw is used to secure the pencil or writing utensil in place for a consistent line.

In some embodiments, a locking member 209 is attached to a dial 103, so once the gears are in the correct position, the locking member can be engaged to keep the gears in position, and to keep the wheels from adjusting.

In the depicted embodiment, the compass is designed to provide radius lengths based on an equation for the radius of curvature:

$$\frac{4H^2 + L^2}{8H}$$

In additional embodiments, based on the design of the internal components, the radius length may be adjusted or modified, thereby altering the equation.

The method of operation requires the user to adjust the positioning of the dial 103 based on the desired radius and inserting the writing utensil through opening 201. As the user rotates the dial gear 104 rotates in unison with the dial, which rotates gear 102. Gear 102 rotates member 500 and gear 101 and gear 101 rotates member 600. The members 500 and 600 are positioned to allow the compass to roll along the selected arch length or radius. The user rolls the compass across the surface to follow the curve, and with the writing utensil the curve is drawn on the surface.

The advantage of the present invention is drawing curves and arcs that are substantially larger than what would normally be able to be drawn. Arcs that would both be difficult to calculate, and even more difficult to draw on a surface without additional equipment that is usually expensive. The present invention is an inexpensive and simple means to draw a large variety of arcs, and with the removable and adjustable gears, there is the ability to expand the size of the arcs by adjusting the gearing ratio of the gears and the adjustment members.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A drafting tool, comprising:

a lower frame member;

an upper frame member;

a rear wheel base, wherein a first portion of the rear wheel base has gear teeth;

a front wheel base, wherein a second portion of the front wheel base has gear teeth;

a control dial;

a drive gear, wherein the drive gear is attached to the control dial;

an adjustment gear, wherein the adjustment gear is in communication with the drive gear and the first portion of the rear wheel base wherein the adjustment gear is comprised of an upper and lower gear;

a connection gear, wherein the connection gear is in communication with the adjustment gear and the second portion of the rear wheel base; and a set of wheels, attached to the rear wheel base and the front wheel base;

wherein the drive gear is in communication with the lower gear of the adjustment gear and the connection gear and the first portion of the rear wheel base are in communication with the upper gear.

2. The drafting tool of claim 1, wherein the drive gear and the adjustment gear are in a ratio of 4:1.

3. The drafting tool of claim 1, wherein the first portion of the rear wheel base and the second portion of the front wheel base are in a ratio of 1:1.

4. The drafting tool of claim 1, wherein the plurality of wheels are able to rotate independent of one another.

5. The drafting tool of claim 1, wherein the drive gear, the adjustment gear, the first gear portion, and the second gear portion all have equally sized teeth.

6. The drafting tool of claim 1, further comprising, a housing.

7. The drafting tool of claim 6, wherein the housing has an aperture sized to receive a writing utensil.

8. The drafting tool of claim 7, further comprising a locking mechanism for the aperture to receive a writing utensil.

9. The drafting tool of claim 6, wherein the lower frame member and the upper frame member has apertures which align with the apertures of the housing.

10. The drafting tool of claim 6, wherein the housing encapsulates the upper frame member and the lower frame member.

* * * * *